(12) United States Patent
Zhang et al.

(10) Patent No.: US 11,407,591 B2
(45) Date of Patent: Aug. 9, 2022

(54) SYSTEM, METHOD, AND APPARATUS FOR TRANSPORTING GOODS

(71) Applicant: BEIJING JINGDONG ZHENSHI INFORMATION TECHNOLOGY CO., LTD., Beijing (CN)

(72) Inventors: Genyun Zhang, Beijing (CN); Kaixuan Wu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 136 days.

(21) Appl. No.: 16/771,599

(22) PCT Filed: Oct. 10, 2018

(86) PCT No.: PCT/CN2018/109679
§ 371 (c)(1),
(2) Date: Jun. 10, 2020

(87) PCT Pub. No.: WO2019/119936
PCT Pub. Date: Jun. 27, 2019

(65) Prior Publication Data
US 2020/0299061 A1    Sep. 24, 2020

(30) Foreign Application Priority Data

Dec. 20, 2017 (CN) .......................... 201711382477.0

(51) Int. Cl.
*B65G 1/137* (2006.01)
(52) U.S. Cl.
CPC .................. *B65G 1/1375* (2013.01)
(58) Field of Classification Search
CPC .................................................. B65G 1/1375
See application file for complete search history.

(56) References Cited

U.S. PATENT DOCUMENTS

| 2014/0346008 A1* | 11/2014 | Hoynash | B65G 1/0478 |
| | | | 198/347.1 |
| 2017/0050803 A1* | 2/2017 | Arnold | B65G 1/1378 |
| 2017/0137222 A1* | 5/2017 | Lert, Jr. | B65G 1/0492 |

FOREIGN PATENT DOCUMENTS

| CN | 101223635 A | 7/2008 |
| CN | 204713851 U | 10/2015 |

(Continued)

OTHER PUBLICATIONS

Supplementary European Search Report for EP 18890900, dated Aug. 27, 2021, 11 pgs.

(Continued)

*Primary Examiner* — Kyle O Logan
(74) *Attorney, Agent, or Firm* — Blank Rome LLP

(57) ABSTRACT

A goods transport system, and a goods transport method and apparatus using the transport system. The system is used for implementing goods transport with a storing shelf (11); the storing shelf (11) comprises a plurality of shelf layers, each shelf layer comprising a goods buffer area and a plurality of goods storage areas; an input transport track (12), used for transporting goods to the storing shelf, the input transport track comprising an input main transport track (121) and a plurality of input sub-transport tracks (122); each input sub-transport track (122) corresponds to one of the shelf layers of the storing shelf, one end of any one of the input sub-transport tracks (122) being connected to the goods buffer area of a shelf layer of the storing shelf, and the other end being connected to the input main transport track (121); and a shuttle trolley (13), used for transporting goods between the goods buffer area and the goods storage areas of a shelf layer.

13 Claims, 7 Drawing Sheets

(56) References Cited

FOREIGN PATENT DOCUMENTS

| | | |
|---|---|---|
| CN | 105292893 A | 2/2016 |
| CN | 105319988 A | 2/2016 |
| CN | 105346913 A | 2/2016 |
| CN | 206456846 U | 9/2017 |
| CN | 107235276 A | 10/2017 |
| CN | 107416400 A | 12/2017 |
| JP | 51122253 A | 10/1976 |
| JP | S-5948313 A | 3/1984 |
| JP | H03284532 A | 12/1991 |
| JP | 05246505 A | 9/1993 |
| JP | 2000118639 A | 4/2000 |
| JP | 2007137549 A | 6/2007 |
| JP | 2007246225 A | 9/2007 |
| JP | 2009143668 A | 7/2009 |
| WO | WO-2017/015011 A1 | 1/2017 |

OTHER PUBLICATIONS

Jun. 3, 2020 Office Action issued in Japanese Patent Application No. 2020-554345 in Japanese.
International Search Report for PCT/CN2018/109679, dated Jan. 14, 2019, 2 pages.

* cited by examiner

SYSTEM, METHOD, AND APPARATUS FOR TRANSPORTING GOODS

CROSS-REFERENCE TO RELATED APPLICATIONS

The present disclosure is a national stage of International Application No. PCT/CN201.8/109679 filed on Oct. 10, 2018, which claims the priority of Chinese Patent Application No. 201711382477.0, filed on Dec. 20, 2017, the contents of which are incorporated herein by reference in their entirety.

TECHNICAL FIELD

Embodiments of the present disclosure relate to the field of automatic control technology, specifically to the field of logistics equipment control technology, and more specifically to a system, method and apparatus for transporting goods.

BACKGROUND

As the logistics industry develops rapidly, high-density, highly automated warehouse storage methods are becoming a major trend in the construction of logistics warehouse storage systems. Under this trend, intensive storage has developed rapidly. As a type of intensive storage, a multi-layer shuttle trolley storage system has also been increasing used.

At present, the multi-layer shuttle trolley storage system mainly includes a multi-layer storing shelf, and a shuttle trolley, elevator, and control system provided on each layer. In actual use, the shuttle trolley and the elevator are used together to complete goods loading and delivering operations. When the goods need to be loaded into a warehouse, for example, the goods may be lifted from the ground to a specified location on one of the layers of the storing shelf by the elevator, and then transported from the specified location on the layer to a storage area by the shuttle trolley. When the goods need to be delivered, for example, the goods may be transported by the shuttle trolley from the storage area to a specified location on the storing shelf layer where the storage area of the goods is located, and then transported from the specified location to the ground by the elevator.

SUMMARY

Embodiments of the present disclosure propose a system, method and apparatus for transporting goods.

In a first aspect, some embodiments of the present disclosure provide a system for transporting goods, used for implementing goods transport with a storing shelf; the storing shelf comprising a plurality of shelf layers, each shelf layer comprising a goods buffer area and a plurality of goods storage areas; the system includes: an input transport track, used for transporting goods to the storing shelf, the input transport track comprising an input transport main track and a plurality of input transport sub-tracks; each input transport sub-track corresponding to one of the shelf layers of the storing shelf, one end of any one of the input transport sub-tracks being connected to a goods buffer area of a shelf layer of the storing shelf, and an other end being connected to the input transport main track; and a shuttle trolley, used for transporting the goods between the goods buffer area and goods storage areas of the shelf layer.

In a second aspect, some embodiments of the present disclosure provide a method for transporting goods, the method includes: receiving a label of a piece of goods moving on the input transport main track scanned by a second label scanner provided at a connection point between an input transport sub-track and an input transport main track of an input transport track; the input transport track comprising the input transport main track and a plurality of input transport sub-tracks, each input transport sub-track corresponding to one shelf layer of a multi-layer storing shelf, one end of any one of the input transport sub-tracks being connected to a goods buffer area of a shelf layer of the storing shelf, and an other end being connected to the input transport main track; determining, based on the label, whether a storage shelf layer corresponding to the piece of goods corresponds to the input transport sub-track; in response to determining that the storage shelf layer of the piece of goods corresponds to the input transport sub-track, sending an instruction to a shunting apparatus provided at the connection point between the input transport sub-track and the input transport main track, to cause the shunting apparatus to shunt the piece of goods to the input transport sub-track; and in response to receiving a label of the piece of goods moving on the input transport sub-track, the label being scanned by a third label scanner provided in the goods buffer area of the shelf layer corresponding to the input transport sub-track, sending an instruction to a shuttle trolley corresponding to the input transport sub-track, to transport the piece of goods from the goods buffer area to a goods storage area corresponding to the piece of goods.

In a third aspect, some embodiments of the present disclosure provide an apparatus for transporting goods, the apparatus includes: a receiving unit, configured to receive a label of a piece of goods moving on the input transport main track scanned by a second label scanner provided at a connection point between an input transport sub-track and an input transport main track of an input transport track; the input transport track comprising the input transport main track and a plurality of input transport sub-tracks, each input transport sub-track corresponding to one shelf layer of a multi-layer storing shelf, one end of any one of the input transport sub-tracks being connected to a goods buffer area of a shelf layer of the storing shelf, and an other end being connected to the input transport main track; a determination unit, configured to determine, based on the label, whether a storage shelf layer corresponding to the piece of goods corresponds to the input transport sub-track; a first sending unit, configured to send, in response to determining that the storage shelf layer of the piece of goods corresponds to the input transport sub-track, an instruction to a shunting apparatus provided at the connection point between the input transport sub-track and the input transport main track, to cause the shunting apparatus to shunt the piece of goods to the input transport sub-track; and a second sending unit, configured to send, in response to receiving a label of the piece of goods moving on the input transport sub-track, the label being scanned by a third label scanner provided in the goods buffer area of the shelf layer corresponding to the input transport sub-track, an instruction to a shuttle trolley corresponding to the input transport sub-track, to transport the piece of goods from the goods buffer area to a goods storage area corresponding to the piece of goods.

In a fourth aspect, some embodiments of the present disclosure provide a server, including: one or more processors; a storage apparatus, for storing one or more programs, and the one or more programs, when executed by the one or more processors, cause the one or more processors to implement the method according to the second aspect.

In a fifth aspect, some embodiments of the present disclosure provide a computer readable storage medium, storing a computer program thereon, the program, when executed by a processor, implements the method according to the second aspect.

According to the system, method and apparatus for transporting goods provided by the embodiments of the present disclosure, by transporting goods to the storing shelf using an input transport track, transporting the goods between the goods buffer area and the goods storage areas by a shuttle trolley, thereby the efficient delivering capacity of the transport track is effectively utilized, and the efficiency of transporting goods between storing shelves is improved.

In some embodiments, the system for transporting goods further includes an output transport track. The system for transporting goods may transport the goods from the input transport track to the storing shelf, and at the same time output the goods to the outside by the output transport track, thereby increasing the circulation speed of goods stored on the storing shelf, and improving the utilization rate of the storing shelf.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
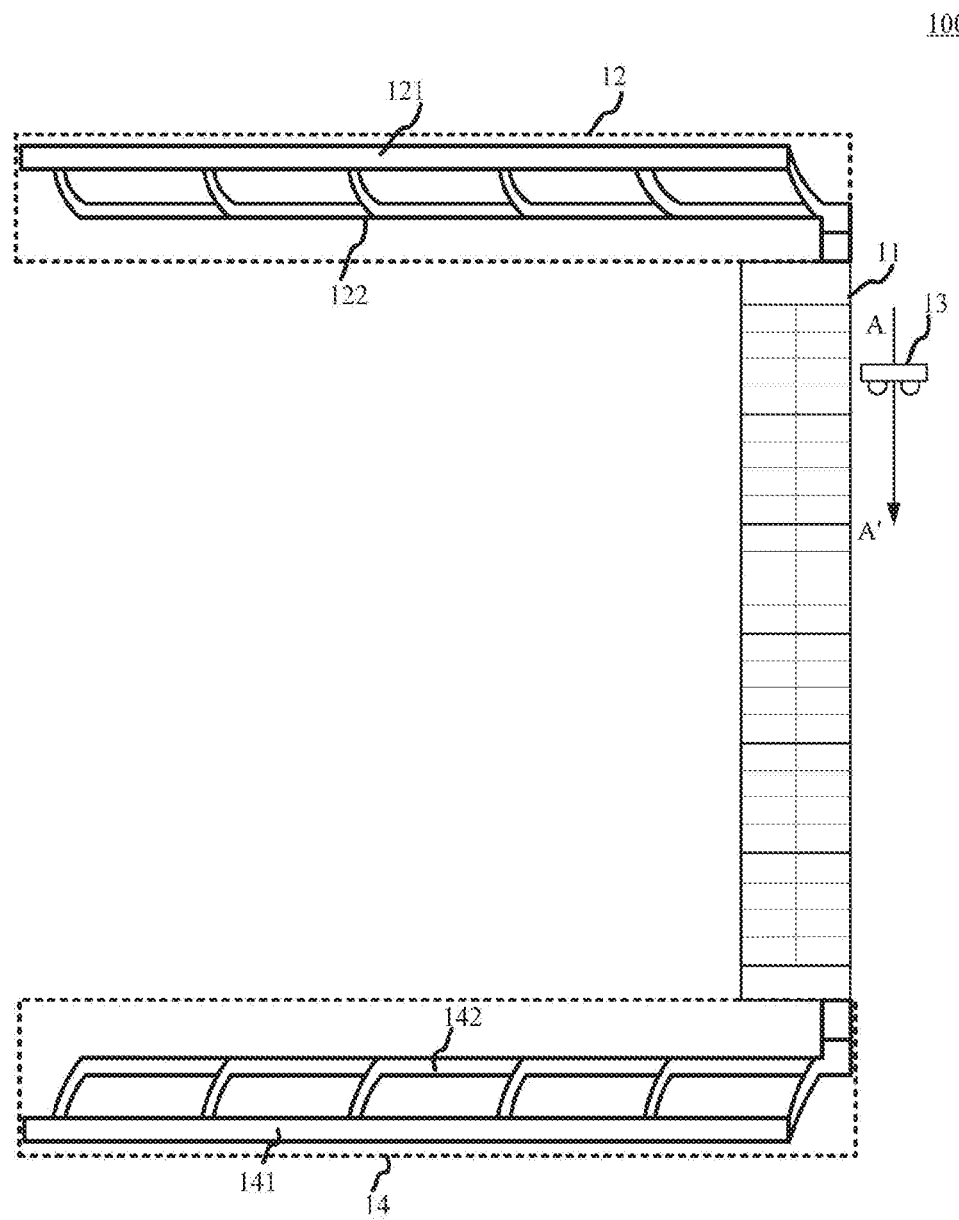
FIG. 1 is a schematic plan view of a system for transporting goods according to an embodiment of the present disclosure.

With reference to FIG. 1, FIG. 1 is a schematic plan view 100 of a system for transporting goods according to an embodiment of the present disclosure.

As shown in FIG. 1, the system for transporting goods may include an input transport track 12 and a shuttle trolley 13.

The system for transporting goods is used for implementing goods transport with a storing shelf 11.

The storing shelf 11 may be various types of storing shelves for storing goods. The storing shelf 11 may be provided in a logistics warehouse, for example. The storing shelf 11 has a rack structure, which may make full use of warehouse space and expand the storage capacity of the warehouse. The storing shelf may have a plurality of shelf layers. Each shelf layer may include a plurality of goods storage areas for storing goods. In addition, in each shelf layer, a goods buffer area may be provided for temporarily storing goods.

The input transport track 12 is used for delivering goods to the storing shelf 11. The input transport track 12 may include an input transport main track 121 and a plurality of input transport sub-tracks 122. Each input transport sub-track 122 may correspond to one of the shelf layers of the storing shelf 11. In some application scenarios, each input transport sub-track 122 may correspond to one of the shelf layers of the storing shelf 11 one-to-one. In some other application scenarios, at least two input transport sub-tracks 122 may correspond to the same shelf layer of the storing shelf 11. One end of any one of the input transport sub-tracks 122 may be connected to the goods buffer area of a shelf layer of the storing shelf 11, and the other end is connected to the input transport main track 121. That is, goods may be directly transported from an input transport sub-track 122 to the goods buffer area of the shelf layer connected to the input transport sub-track 122.

The shuttle trolley 13 may be various types of shuttle trolleys. The shuttle trolley 13 is used for transporting goods between the goods buffer area and the goods storage areas of a shelf layer of the storing shelf 11. For each shelf layer, the shuttle trolley 13 may transport goods between the goods buffer area and the goods storage areas of the shelf layer. In some application scenarios, each of the shelf layers may correspond to a shuttle trolley 13, and the shuttle trolley 13 corresponding to the each shelf layer may transport goods between the goods buffer area and the goods storage areas of the shelf layer.

In the present embodiment, the input transport main track 121 of the input transport track 12 may transport goods to one of the input transport sub-tracks 122. The input transport sub-track 122 then transports the goods to the goods buffer area of one of the shelf layers of the storing shelf 11. The shuttle trolley 13 then transports the goods from the goods buffer area to a goods storage area.

The system for transporting goods provided by the present embodiment, uses an input transport track to transport goods to the respective shelf layers, so that a plurality of goods transported to the shelf layers may be transported on the input transport track at the same time, which improves the efficiency of the system for transporting goods for transporting goods to the storing shelf. In addition, a goods buffer area is provided at each shelf layer, and a shuttle trolley transports goods between the goods buffer area and the goods storage areas of the each shelf layer, so that the system for transporting goods may continuously transport goods to the same shelf layer, further improving the efficiency of transporting goods to the storing shelf.

In some alternative implementations of the present embodiment, when storing goods to the storing shelf 11, each piece of goods may correspond to a goods storage area. Before a piece of goods is transported to the input transport track 12, a storage shelf layer and a goods storage area may be allocated for the piece of goods. In some application scenarios, the code corresponding to the storage shelf layer and the goods storage area storing the piece of goods may be set in a label corresponding to the goods. Before the piece of goods is placed on the input transport track 12, the label may be attached to the corresponding piece of goods. Here, the label may be used to identify the identity of the piece of goods, and the shelf layer and the goods storage area corresponding to the piece of goods and specified in advance. The label may be a label in the form of a barcode or a label in the form of a two-dimensional code, which is not limited herein.

In some alternative implementations of the present embodiment, a first label scanner (not shown in the figure) may be provided at a connection point between any one of the input transport sub-tracks 122 and the input transport main track 121. The first label scanner may be configured to scan and recognize the label of the piece of goods moving on the input transport main track 121, and then determine the shelf layer corresponding to the piece of goods according to a result of the identification on the label, thereby determining the input transport sub-track 122 that the piece of goods need to enter. In these alternative implementations, since the first label scanner scanning and recognizing the label of the goods is provided at the connection point between an input transport sub-track 122 and the input transport main track 121, for any piece of goods having specified storage shelf layer and goods storage area, the first label scanner may recognize the storage shelf layer corresponding to the piece of goods from the label, and determine whether the recognized shelf layer for storing the piece of goods is the same as the corresponding shelf layer of the first label scanner. If same, it is determined that the input transport sub-track 122 corresponding to the piece of goods is the input transport sub-track 122 connected to the first label scanner.

In some alternative implementations of the present embodiment, a shunting apparatus (not shown in the figure) may be provided at the connection point between any one of the input transport sub-tracks 122 and the input transport main track 121. The shunting apparatus may be configured to shunt the goods moving on the input transport main track 121 to the input transport sub-track 122 corresponding to the goods.

In some application scenarios, after the first label scanner determines that the shelf layer corresponding to the piece of goods on the input transport main track 121 is the shelf layer corresponding to the input transport sub-track 122 connected to the first label scanner, the shunting apparatus provided at the connection point between the input transport sub-track 122 connected to the first label scanner and the input transport main track 121 may be triggered to shunt the piece of goods from the input transport main track 121 to the above input transport sub-track 122. Specifically, for example, after determining that the storage shelf layer corresponding to the piece of goods is the same as the shelf layer corresponding to the input transport sub-track 122 connected to the first label scanner, the first label scanner may send a pulse signal to trigger the shunting apparatus to divert the piece of goods from the input transport main track 121 to the above input transport sub-track 122 connected to the shelf layer corresponding to piece of goods.

In some alternative implementations of the present embodiment, the system for transporting goods may further include an output transport track 14. The input transport track 12 and the output transport track 14 may be respectively provided at opposite ends of the storing shelf 11 in the direction AA' in which the goods are transported from the goods buffer area to the goods storage area, as shown in FIG. 1.

The output transport track 14 is configured to output goods from the storing shelf 11. The output transport track 14 may include an output transport main track 141 and a plurality of output transport sub-tracks 142. Each output transport sub-track 142 is connected to one of the shelf layer of the storing shelf 11, and the other end is connected to the output transport main track 141. In this way, when a piece of goods need to be output from the storing shelf 11, the shuttle trolley 13 may transport the piece of goods from its storage area to the output transport sub-track 142 corresponding to the shelf layer where its storage area is located, then the output transport sub-track 142 transports the piece of goods to the output transport main track 141, and finally the output transport main track 141 transports the piece of goods to a location specified in advance. In this way, the system for transporting goods may transport the piece of goods from the input transport track 12 to the storing shelf 11, and at the same time may output the piece of goods from the storing shelf 11 by the output transport track 14, which increases the circulation speed of goods stored on the storing shelf, thus improving the utilization rate of the storing shelf.

In some alternative implementations of the present embodiment, the shuttle trolley 13 may be a two-station shuttle trolley. Each station of the shuttle trolley 13 may accommodate at least one piece of goods at the same time. Since the shuttle trolley 13 is a two-station shuttle trolley, each station may accommodate at least one piece of goods at the same time, so that the shuttle trolley may transport a plurality of pieces of goods at the same time, which is beneficial to improving the transport efficiency for transporting goods between the system for transporting goods and the storing shelf.

Figure 2:
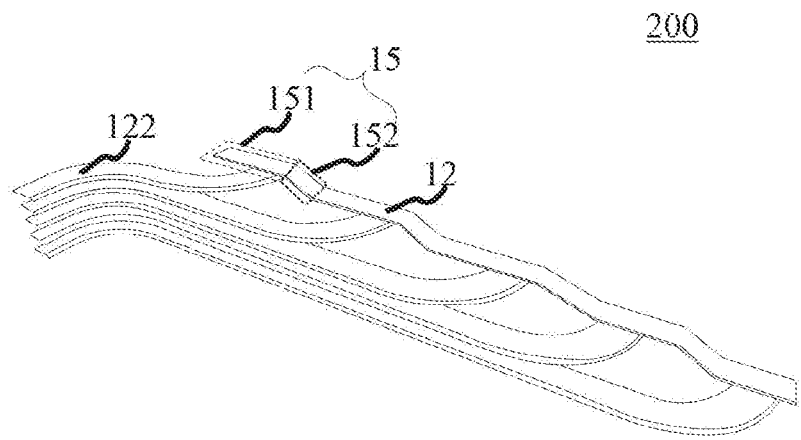
FIG. 2 is a schematic side structural view of an input transport track/output transport track according to an embodiment of the present disclosure.

In some alternative implementations of the present embodiment, with reference to FIG. 2, a schematic side structural view 200 of an alternative implementation of an input transport track/output transport track according to the present disclosure is shown. The transport track shown in FIG. 2 may be an input transport track or an output transport track.

In the following, the input transport track will be used as an example.

The input transport main track 121 of the input transport track 12 may include a plurality of transport segments 15 connected end to end. Each transport segment 15 includes a first transport sub-segment 151 and a second transport sub-segment 152 connected to each other. The first transport sub-segment 151 may be parallel to the horizontal plane. The second transport sub-segment 152 may be at a predetermined angle with the horizontal plane. As shown in FIG. 2, the first transport sub-segment 151 of any one of the transport segments 15 may be connected to an input transport sub-track 122. The first transport sub-segment 151 of one of any two adjacent transport segments 15 is connected to the second transport sub-segment 152 of the other transport segment. It may be understood that if the transport track shown in FIG. 2 is an output transport track, the first transport sub-segment 151 of any one transport segment 15 may be connected to one output transport sub-track 142.

Figure 3:
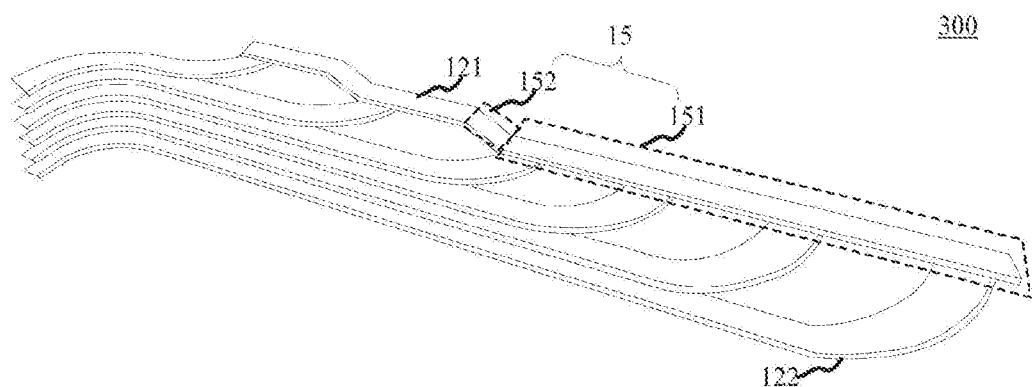
FIG. 3 is another schematic side structural view of the input transport track/output transport track according to an embodiment of the present disclosure.

With reference to FIG. 3, FIG. 3 is a schematic side structural view 300 of another alternative implementation of the input transport track/output transport track according to the present disclosure. The transport track shown in FIG. 3 may be an input transport track or an output transport track.

In the following, the input transport track will be used as an example.

The input transport main track 121 of the input transport track 12 may include a plurality of transport segments 15 connected end to end. Each transport segment 15 includes a first transport sub-segment 151 and a second transport sub-segment 152 connected to each other. The first transport sub-segment 151 may be parallel to the horizontal plane. The second transport sub-segment 152 may be at a predetermined angle with the horizontal plane. As shown in FIG. 3, a first transport sub-segment 151 of a transport segment 15 is connected to at least two input transport sub-tracks 122. The first transport sub-segment 151 of one of any two adjacent transport segments 15 is connected to the second transport sub-segment 152 of the other transport segment. It may be understood that if the transport track is an output transport track, the first transport sub-segment 151 of a transport segment 15 may be connected to at least two output transport sub-tracks 142.

In some application scenarios, at least two input transport sub-tracks/output transport sub-tracks may be connected to the same shelf layer. In this way, the at least two input transport sub-tracks/output transport sub-tracks connected to the same shelf layer may be connected to the same first transport sub-segment 151 at the same time. In some other application scenarios, at least two input transport sub-tracks/output transport sub-tracks connected to different shelf layers may be connected to the same first transport sub-segment 151 at the same time.

In practical applications, the input transport track and/or the output transport track shown in FIG. 2 or FIG. 3 may be selected according to the actual size of the location space for setting the input transport track and the output transport track.

Figure 4:
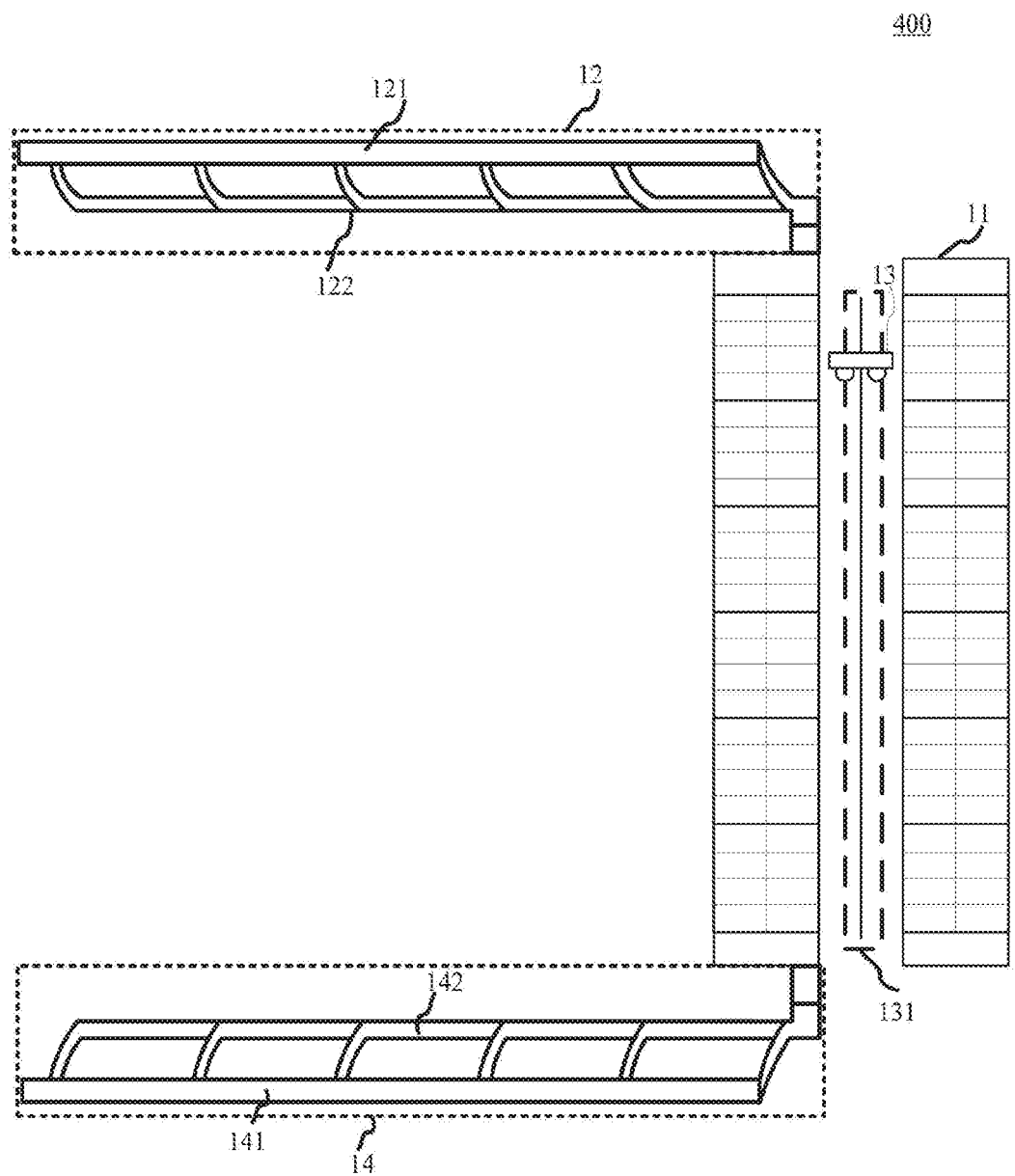
FIG. 4 is a schematic plan view of the system for transporting goods according to another embodiment of the present disclosure.

With reference to FIG. 4, a schematic plan view 400 of another embodiment of the system for transporting goods according to the present disclosure is shown.

As shown in FIG. 4, the system for transporting goods may include an input transport track 12, an output transport track 14, and a shuttle trolley 13.

The system for transporting goods is used for implementing goods transport with a storing shelf 11.

The input transport track 12 may include an input transport main track 121 and a plurality of input transport sub-tracks 122. Each input transport sub-track 122 may correspond to one of the shelf layers of the storing shelf 11. One end of an input transport sub-track 122 may be connected to the goods buffer area of a shelf layer of the storing shelf 11, and the other end is connected to the input transport main track 121. A connection point between the input transport sub-track 122 and the input transport main track 121 may be provided with a first label scanner (not shown in the figure) and a shunting apparatus (not shown in the figure).

The output transport track 14 is configured to output goods from the storing shelf 11. The output transport track 14 may include an output transport main track 141 and a plurality of output transport sub-tracks 142. an output transport sub-track 142 is connected to a shelf layer of the storing shelf 11, and the other end is connected to the output transport main track 141.

The shuttle trolley 13 may be provided in a track provided between shelf layers of the same height between two adjacent storing shelves 11. The shuttle trolley 13 may travel on the track.

In the present embodiment, the input transport track 12 and the output transport track 14 may be connected to the same storing shelf, respectively, and the input transport track 12 and the output transport track 14 are respectively disposed at opposite ends of a line segment 131, the line segment is formed by a traveling track of the shuttle trolley 13 between the shelf layers of the same height of two adjacent storing shelves 11, as shown in FIG. 4.

In the present embodiment, a label attached to a piece of goods may include an identifier characterizing the identity of the piece of goods and the storage location for storing the piece of goods. For example, the label attached to a piece of goods may include an identifier for indicating the piece of goods are to be stored in which goods storage area of which shelf layer of which storing shelf. When the piece of goods are to be transported to the storing shelf 11, the piece of goods may be placed on the input transport main track 121. The above label may be attached to the piece of goods. When the piece of goods are transported to the connection point between an input transport sub-track 122 and the input transport main track 121, a first label scanner provided at the connection point between the input transport sub-track 122 and the input transport main track 121 may scan the label attached on the piece of goods, and recognize the storing shelf, shelf layer, and goods storage area corresponding to the piece of goods from the label. When the first label scanner determines that the input transport sub-track 122 corresponding to the piece of goods is the input transport sub-track 122 connected to the first label scanner according to the shelf layer indicated by the label, the shunting apparatus may be triggered to shunt the piece of goods from the input transport main track 121 to the input transport sub-track 122 corresponding to the piece of goods. After the piece of goods reaches the goods buffer area of the shelf layer corresponding to the piece of goods, the shuttle trolley 13 then transports the piece of goods from the goods buffer area to the goods storage area of the corresponding storing shelf according to the storage location indicated by the label of the piece of goods. When the goods is output from the storing shelf 11 to the outside, the shuttle trolley 13 may transport different pieces of goods in a plurality of storage areas of two adjacent storing shelves 11 to the output transport track 14 for output during one transporting process of the goods.

The system for transporting goods provided by the present embodiment may transport goods with two adjacent storing shelves at the same time, which may improve the utilization rate of the system for transporting goods.

Figure 5:
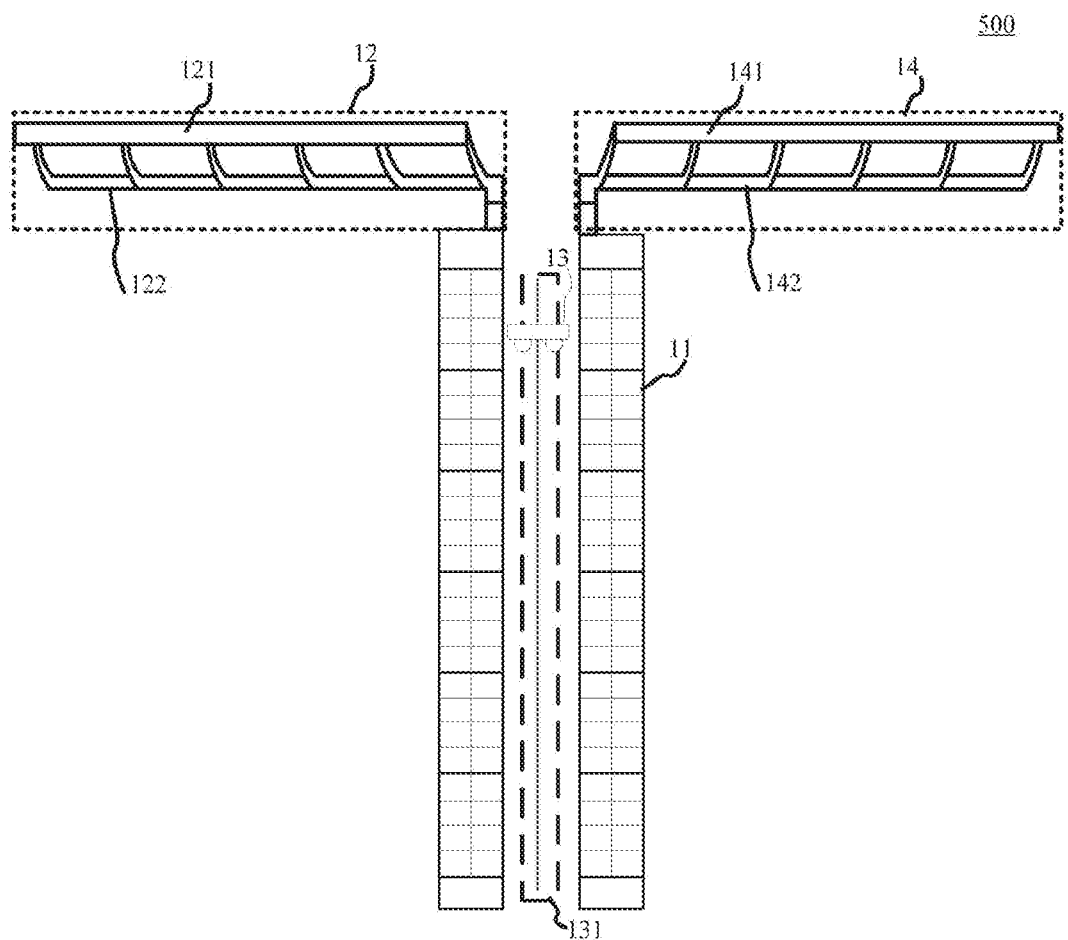
FIG. 5 is a schematic plan view of the system for transporting goods according to another embodiment of the present disclosure.

With reference to FIG. 5, another schematic plan view 500 of another embodiment of the system for transporting goods according to the present disclosure is shown.

Same to the system for transporting goods shown in FIG. 4, the system for transporting goods may include an input transport track 12, an output transport track 14, and a shuttle trolley 13.

The system for transporting goods is used for transporting goods with two adjacent storing shelves 11. The shuttle trolley 13 may travel in a track provided between the shelf layers of the same height of two adjacent storing shelves.

Different from the embodiment shown in FIG. 4, in the embodiment shown in FIG. 5, the input transport track 12 and the output transport track 14 are connected to one of the two adjacent storing shelves 11 in one-to-one correspondence, respectively, and the input transport tracks 12 and the output transport track 14 are provided at the same end of the line segment 131 formed by the traveling trajectory of the shuttle trolley 13.

In practical applications, the setting mode of the input transport track and/or the output transport track shown in FIG. 4 or FIG. 5 may be selected according to the actual size of the location space for setting the input transport track, the output transport track and the storing shelf.

Figure 6:
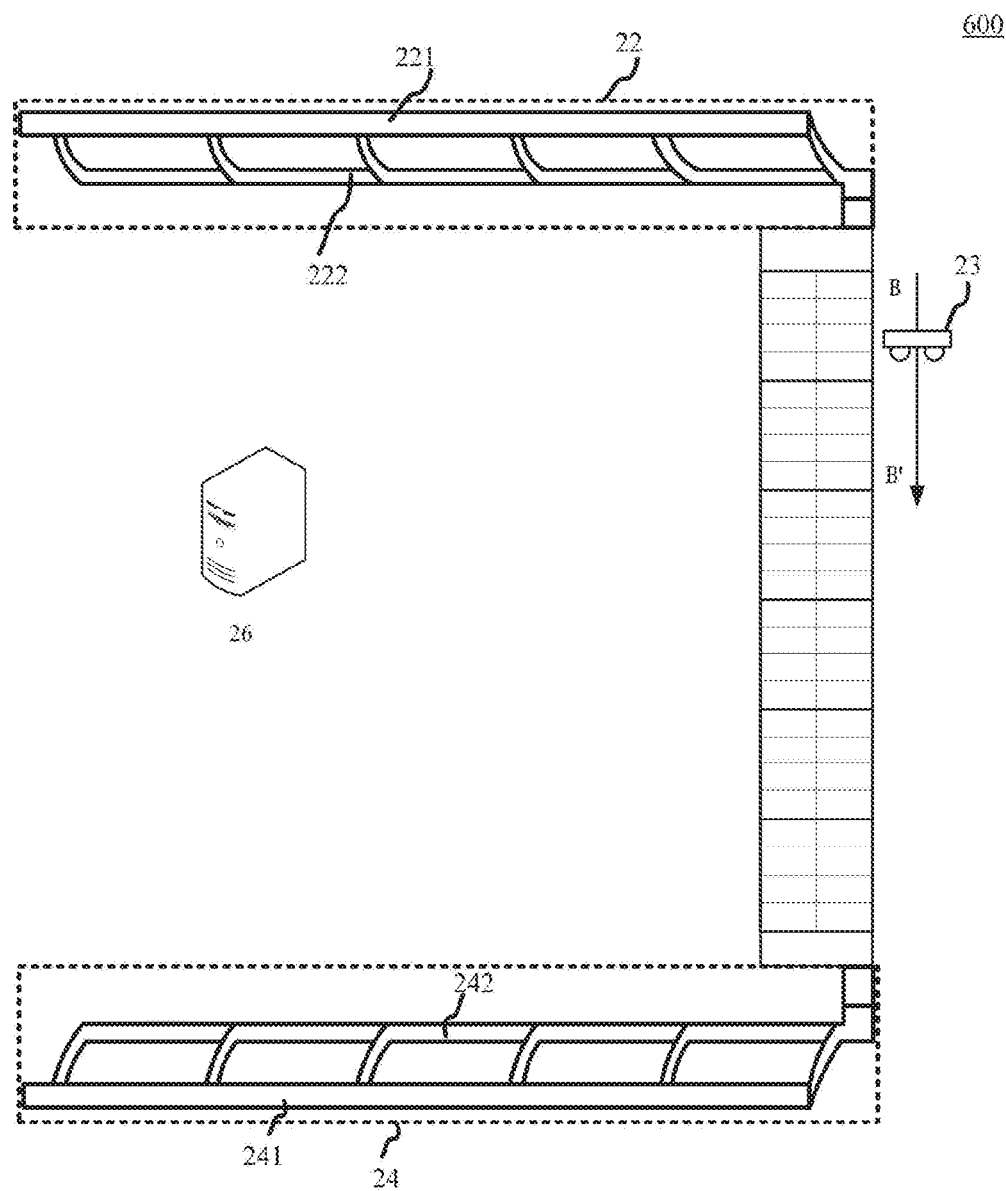
FIG. 6 is a schematic plan view of the system for transporting goods according to another embodiment of the present disclosure.

With further reference to FIG. 6, a schematic plan view 600 of another embodiment of the system for transporting goods according to the present disclosure is shown.

The system for transporting goods includes an input transport track 22, a shuttle trolley 23, an output transport track 24, and a server 26.

The system for transporting goods may transport goods with a storing shelf 21. The storing shelf 21 may include a plurality of shelf layers. Each shelf layer may include a goods buffer area and a plurality of goods storage areas.

The server 26 may be a server that provides various services, for example, may determine a storage location corresponding to a piece of goods, and dispatch the input transport track and shuttle trolley to transport the piece of goods to the corresponding storage location of the goods. In the present embodiment, the storage location may include a shelf layer and a goods storage area.

The input transport track 22 may transport goods to the storing shelf. The input transport track 22 includes an input transport main track 221 and a plurality of input transport sub-tracks 222. Each input transport sub-track 222 corresponds to one of the shelf layers of the storing shelf 21. One end of any one of the input transport sub-tracks 222 is connected to the goods buffer area of a shelf layer, and the other end is connected to the input transport main track 221.

The shuttle trolley 23 may transport goods between the goods buffer area and the goods storage areas of one of the shelf layers.

The output transport track 24 may output goods from the storing shelf 21. The output transport track 24 may include an output transport main track 241 and a plurality of output transport sub-tracks 242. Each output transport sub-track 242 corresponds to one shelf layer of the storing shelf 21. One end of any one of the output transport sub-tracks 242 is connected to one of the shelf layers of the storing shelf 21, and the other end is connected to the output transport main track 241. In the present embodiment, the input transport track 22 and the output transport track 24 may be respectively provided at opposite ends of the storing shelf 21 in the direction BB' in which the goods are transported from the goods buffer area to the goods storage area.

In the present embodiment, each goods may correspond to one goods storage area. In some application scenarios, the server 26 may allocate a storage location for the goods before the goods are input to the input transport track. A label for identifying the identity and storage location of the goods may be attached to the corresponding goods. In some other application scenarios, the label attached to the goods may only be used to identify the identity of the goods, and when the goods are placed on the input transport track 22, the storage location is allocated to the goods by the server.

In the present embodiment, a second label scanner (not shown in the figure) is provided at a connection point between any one of the input transport sub-tracks 222 and the input transport main track 221. The second label scanner is configured to scan the label of the goods moving on the input transport main track, and send the scanned label to the server 26, so that the server 26 determines whether to transport the goods to the input transport sub-track 222 according to the scanned label. That is, the second label scanner, which is provided at the connection point between an input transport sub-track 222 and the input transport main track 221, sends the scanned label of the goods moving on the input transport main track 221 to the server 26, for the server 26 to recognize the identity of the goods and its storage location on the label and determine whether to transport the goods to this input transport sub-track 222.

In some alternative implementations of the present embodiment, a shunting apparatus (not shown in the figure) may be provided at the connection point between any one of the input transport sub-tracks 222 and the input transport main track 221. The shunting apparatus may be configured to shunt the goods moving on the input transport main track 221 to the input transport sub-track 222 corresponding to the goods.

In some alternative implementations of the present embodiment, a third label scanner (not shown in the figure) may be provided in the goods buffer area of any one of the shelf layers. The third label scanner may be configured to scan a label of the goods transported from the input transport sub-track 122 to the goods buffer area of the shelf layer, and send the storage location indicated by the scanned label to the server 26, so that the server 26 dispatches a shuttle trolley 23 corresponding to the shelf layer to transport the goods from the goods buffer area of the shelf layer to the goods storage area corresponding to the goods according to the scanned label. That is, the third label scanner provided in the goods buffer area of a shelf layer may scan the label of the goods transported from the input transport sub-track 222 to the goods buffer area of the shelf layer in real time, and send the scanned goods label to the server 26. The server 26 may recognize the storage location of the goods according to the label of the goods. The server 26 dispatches the shuttle trolley 23 corresponding to the shelf layer according to the shelf layer indicated by the storage location of the goods to take the goods out from the buffer area and transport the goods to the storage area indicated by the storage location of the goods.

In some alternative implementations of the present embodiment, the input transport track 22 and the output transport track 24 may be connected to the same storing shelf 21, respectively, and the input transport track 22 and the output transport track 24 are respectively disposed at opposite ends of a line segment formed by a traveling track of the shuttle trolley 23 between storing shelf layers of the same height of two adjacent storing shelves 21. In these alternative implementations, a label attached to the goods may include an identifier characterizing the identity of the goods and the storage location for storing the goods. Here, the identifier of the goods storage location of the goods is, for example, an identifier used to indicate the goods are to be stored in which goods storage area of which shelf layer of which storing shelf.

In some alternative implementations of the present embodiment, the input transport track 22 and the output transport track 24 are connected to one of two adjacent storing shelves 21 in one-to-one correspondence, respectively, and the input transport tracks 22 and the output transport track 24 are provided at the same end of a line segment formed by the traveling track of the shuttle trolley 23 between the shelf layers of the same height of two adjacent storing shelves 21. In these alternative implementations, the label attached to the goods includes an identifier characterizing the identity of the goods and the storage location for storing the goods. Here, the identifier of the goods storage location of the goods is, for example, an identifier used to indicate the goods are to be stored in which goods storage area of which shelf layer of which storing shelf.

In some alternative implementations of the present embodiment, the shuttle trolley 23 may be a two-station shuttle trolley. Each station of the shuttle trolley 23 may accommodate at least one piece of goods at the same time. Since the shuttle trolley 23 is a two-station shuttle trolley, each station may accommodate at least one piece of goods at the same time, so that the shuttle trolley may transport a plurality of goods at the same time, which is beneficial to improving the goods transport efficiency of the system for transporting goods.

Compared with the system for transporting goods shown in FIG. 1, the system for transporting goods provided by the present embodiment uses a server to dispatch to transport goods to the storing shelf and output goods from the storing shelf. Because the server controls the input and output of the goods to and from the storing shelf, it may control the status of each storage area of the storing shelf in real time, which is beneficial to strengthening the management of goods and increasing the utilization rate of the storage areas of the storing shelf.

Figure 7:
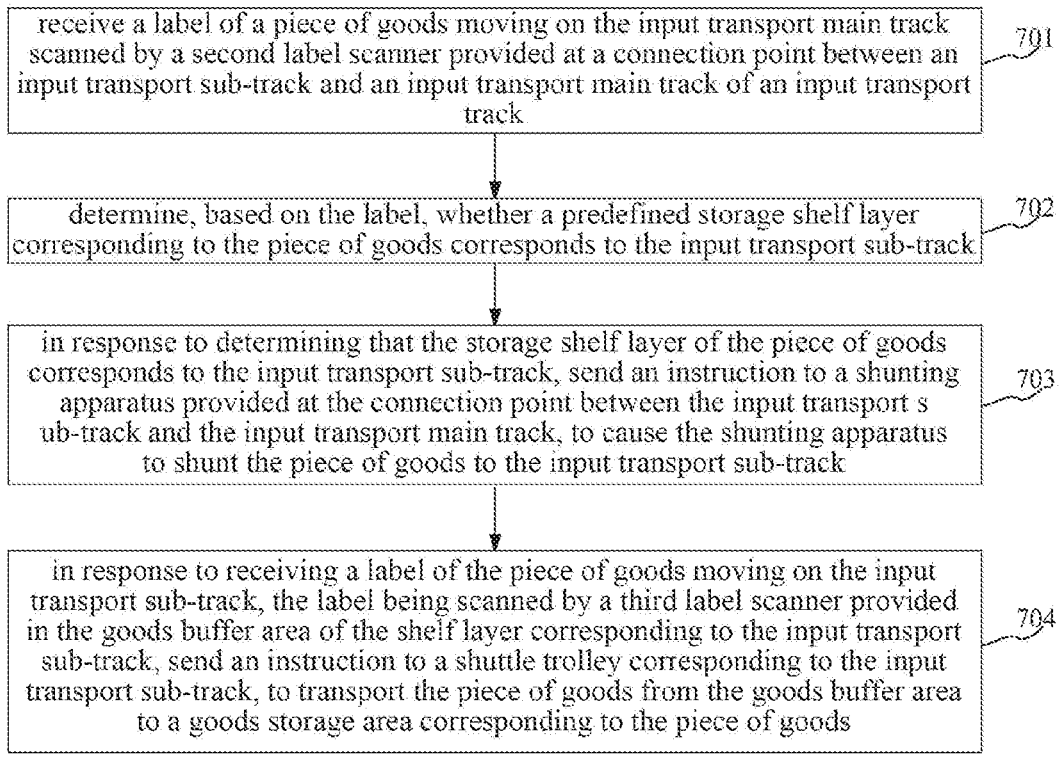
FIG. 7 is a flowchart of a method for transporting goods according to an embodiment of the present disclosure.

With reference to FIG. 7, FIG. 7 is a flowchart 700 of a method for transporting goods according to an embodiment of the present disclosure.

As shown in FIG. 7, the method for transporting goods includes the following steps:

Step 701, receiving a label of a piece of goods moving on the input transport main track scanned by a second label scanner provided at a connection point between an input transport sub-track and an input transport main track of an input transport track.

In the present embodiment, the input transport track includes the input transport main track and a plurality of input transport sub-tracks. Each input transport sub-track corresponds to one shelf layer of a multi-layer storing shelf. For example, each input transport sub-track may correspond to one shelf layer of the plurality of shelf layers in one-to-one correspondence. As another example, at least two input transport sub-tracks may correspond to the same shelf layer of the plurality of shelf layers. One end of any one of the input transport sub-tracks is connected to the goods buffer area of a shelf layer of the storing shelf, and the other end is connected to the input transport main track. That is, the goods may be input into the goods buffer area of the storing shelf through the input transport sub-track.

In the present embodiment, an electronic device (for example, the server shown in FIG. 5) on which the method for transporting goods operates may receive the label of the piece of goods moving on the input transport main track scanned by the second label scanner at the connection point between any one of the input transport sub-tracks and the input transport main track on the input transport track through a wired connection or a wireless connection. Here, the label may include the identity of the piece of goods. In some application scenarios, the label may also include a storage location corresponding to the piece of goods. The storage location may include a shelf layer and a goods storage area corresponding to the piece of goods.

When the piece of goods on the input transport, main track is transported to a proximity of an input transport sub-track, the second label scanner between the input transport sub-track and the input transport main track may scan the label attached on the piece of goods, and send the scanned label to the electronic device.

Step 702, determining, based on the label, whether a predefined storage shelf layer corresponding to the piece of goods corresponds to the input transport sub-track.

After receiving the label of the piece of goods scanned by the second label scanner provided at the connection point between the input transport sub-track and the input transport main track in step 701, the electronic device may recognize the identity of the piece of goods based on the label and allocate a storage location suitable for the goods. If a shelf layer allocated by the electronic device for the piece of goods is the same as the shelf layer connected to the input transport sub-track connected to the second label scanner, it is determined that the shelf layer corresponding to the piece of goods corresponds to the input transport sub-track. In some application scenarios, the above label may further include a storage location allocated for the piece of goods in advance. The electronic device may recognize the storage location indicated in the label. When the shelf layer indicated in the label is the same as the shelf layer connected to the input transport sub-track connected to the second label scanner, it is determined that the shelf layer corresponding to the piece of goods corresponds to the input transport sub-track.

Step 703, in response to determining that the storage shelf layer of the piece of goods corresponds to the input transport sub-track, sending an instruction to a shunting apparatus provided at the connection point between the input transport sub-track and the input transport main track, to cause the shunting apparatus to shunt the piece of goods to the input transport sub-track.

When it is determined that the storage shelf layer of the piece of goods corresponds to the input transport sub-track, the electronic device may send an instruction to the shunting apparatus provided at the connection point between the input transport sub-track and the input transport main track to, cause the shunting apparatus to shunt the piece of goods to the input transport sub-track. After receiving the instruction sent by the electronic device, the shunting apparatus performs an operation of shunting the goods to the input transport sub-track The piece of goods is transported thorough the above input transport sub-track to the buffer area of the shelf layer connected to the input transport sub-track.

Step 704, in response to receiving a label of the piece of goods transported from the input transport sub-track to the goods buffer area of the shelf layer, the label being scanned by a third label scanner provided in the goods buffer area of the shelf layer corresponding to the input transport sub-track, sending an instruction to a shuttle trolley corresponding to the input transport sub-track, to transport the piece of goods from the goods buffer area to a goods storage area corresponding to the piece of goods.

When the goods are transported from an input transport sub-track to the goods buffer area of the shelf layer connected to the input transport sub-track, the third scanner provided in the goods buffer area of the shelf layer may scan the label of the piece of goods and send the label to the electronic device. When receiving the label of the piece of goods scanned by the third scanner, the electronic device may send an instruction to the shuttle trolley corresponding to the input transport sub-track, so that the shuttle trolley transports the piece of goods from the goods buffer area to the goods storage area corresponding to the piece of goods.

In some alternative implementations of the present embodiment, the method for transporting goods further includes: the electronic device receives a delivery instruction of the piece of goods, where the delivery instruction includes a storage location of the piece of goods, and the storage location includes a shelf layer and a goods storage area in which the piece of goods is stored. The electronic device sends an instruction to a shuttle trolley corresponding to the shelf layer indicated by the delivery instruction, to transport the piece of goods from the goods storage area to an output transport sub-track connected to the shelf layer of an output transport track. The output transport track includes an output transport main track and a plurality of output transport sub-tracks, each output transport sub-track corresponds to one of the shelf layers of the storing shelf, one end of any one of the output transport sub-tracks is connected to one of the shelf layers of the storing shelf, and the other end is connected to the output transport main track.

Figure 8:
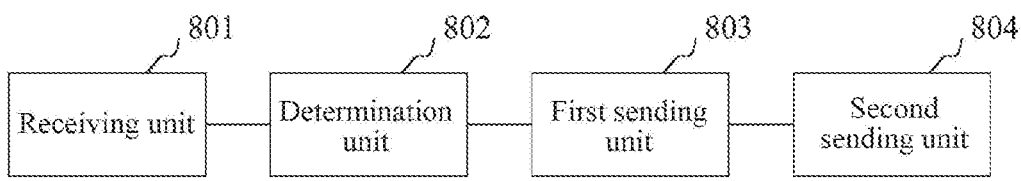
FIG. 8 is a schematic structural diagram of an apparatus for transporting goods according to an embodiment of the present disclosure.

With reference to FIG. 8, FIG. 8 is a schematic structural diagram 800 of an apparatus for transporting goods according to an embodiment of the present disclosure.

As shown in FIG. 8, the apparatus for transporting goods includes: a receiving unit 801, a determination unit 802, a first sending unit 803, and a second sending unit 804. The receiving unit 801 is configured to receive a label of a piece of goods moving on the input transport main track scanned by a second label scanner provided at a connection point between an input transport sub-track and an input transport main track of an input transport track; the input transport track including the input transport main track and a plurality of input transport sub-tracks, each input transport sub-track corresponding to one shelf layer of a multi-layer storing shelf, one end of any one of the input transport sub-tracks being connected to a goods buffer area of a shelf layer of the storing shelf, and the other end being connected to the input transport main track. The determination unit 802 is configured to determine, based on the label, whether a redefined storage shelf layer corresponding to the piece of goods corresponds to the input transport sub-track. The first sending unit 803 is configured to send, in response to determining that the predefined storage shelf layer of the piece of goods corresponds to the input transport sub-track, an instruction to a shunting apparatus provided at the connection point between the input transport sub-track and the input transport main track, to cause the shunting apparatus to shunt the piece of goods to the input transport sub-track. The second sending unit 804 is configured to send, in response to receiving a label of the piece of goods moving on the input transport sub-track, the label being scanned by a third label scanner provided in the goods buffer area of the shelf layer corresponding to the input transport sub-track, an instruction to a shuttle trolley corresponding to the input transport sub-track, to transport the piece of goods from the goods buffer area to a goods storage area corresponding to the piece of goods.

In some alternative implementations of the present embodiment, the apparatus for transporting goods further includes a delivering unit, and the delivering unit is configured to: receive a delivery instruction of the piece of goods, where the delivery instruction includes a storage location of piece of the goods, and the storage location includes a shelf layer and a goods storage area in which the piece of goods is stored; and send an instruction to a shuttle trolley corresponding to the shelf layer, to transport the piece of goods from the goods storage area to an output transport sub-track connected to the shelf layer of an output transport track. The output transport track includes an output transport main track and a plurality of output transport sub-tracks; and each output transport sub-track corresponds to one of the shelf layers of the storing shelf, one end of any one of the output transport sub-tracks is connected to one of the shelf layers of the storing shelf, and the other end is connected to the output transport main track.

Figure 9:
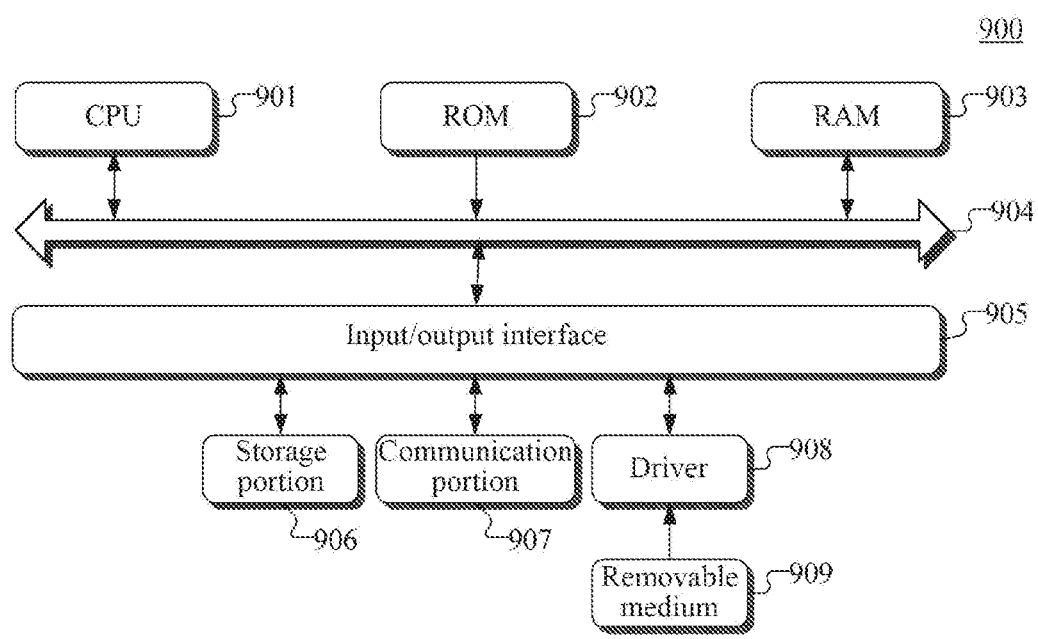
FIG. 9 is a schematic structural diagram of a computer system adapted to implement a server according to an embodiment of the present disclosure.

Referring to FIG. 9, a schematic structural diagram of a computer system 900 adapted to implement a server of the embodiments of the present disclosure is shown. The server shown in FIG. 9 is just an example, and should not bring any limitation to the function and usage range of the embodiments of the present disclosure.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 906. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: a storage portion 906 including a hard disk and the like; and a communication portion 907 comprising a network interface card, such as a LAN card and a modem. The communication portion 907 performs communication processes via a network, such as the Internet. A driver 908 is also connected to the I/O interface 905 as required. A removable medium 909, such as a magnetic disk, an optical disk, a magneto-optical disk, and a semiconductor memory, may be installed on the driver 908 as needed to facilitate the retrieval of a computer program from the removable medium 909, and the installation thereof on the storage portion 906.

In particular, according to some embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 907, and/or may be installed from the removeable medium 909. The computer program, when executed by the central processing unit (CPU) 901, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a receiving unit, a determination unit, a first sending unit, and a second sending unit. Here, the names of these units do not in some cases constitute limitations to such units themselves. For example, the receiving unit may also be described as "a unit configured to receive a label of a piece of goods, the label being scanned by a second label scanner".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive a label of a piece of goods moving on the input transport main track scanned by a second label scanner provided at a connection point between an input transport sub-track and an input transport main track of an input transport track; the input transport track including the input transport main track and a plurality of input transport sub-tracks, each input transport sub-track corresponding to one shelf layer of a multi-layer storing shelf, one end of any one of the input transport sub-tracks being connected to a goods buffer area of a shelf layer of the storing shelf, and the other end being connected to the input transport main track; determine, based on the label, whether a storage shelf layer corresponding to the piece of goods corresponds to the input transport sub-track; in response to determining that the storage shelf layer of the piece of goods corresponds to the input transport sub-track, sending an instruction to a shunting apparatus provided at a connection point between the input transport sub-track and the input transport main track, to cause the shunting apparatus to shunt the piece of goods to the input transport sub-track; and in response to receiving a label of the piece of goods moving on the input transport sub-track, the label being scanned by a third label scanner provided in the goods buffer area of the shelf layer corresponding to the input transport sub-track, sending an instruction to a shuttle trolley corresponding to the input transport sub-track, to transport the piece of goods from the goods buffer area to a goods storage area corresponding to the piece of goods.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A system for transporting goods, the system being used for implementing goods transport with a storage rack; the storage rack comprising a plurality of shelf layers, and each shelf layer comprising a goods buffer area and a plurality of goods storage areas;

wherein the system comprises:
an input transport track, used for transporting goods to the storage rack, the input transport track comprising an input transport main track and a plurality of input transport sub-tracks; each input transport sub-track corresponding to one of the shelf layers of the storage rack, one end of any one of the input transport sub-tracks being connected to a goods buffer area of a shelf layer of the storage rack, and the other end being connected to the input transport main track; and a shuttle trolley, used for transporting the goods between the goods buffer area and goods storage areas of the shelf layer, wherein the system further comprises an output transport track, configured to output the goods from the storage rack, wherein the output transport track comprises an output transport main track and a plurality of output transport sub-tracks; and each output transport sub-track corresponds to one of the shelf layers of the storage rack, one end of any one of the output transport sub-tracks is connected to one of the shelf layers of the storage rack, and the other end is connected to the output transport main track;

the shuttle trolley travels in a track provided between storage rack layers of a same height of two adjacent storage racks; and the input transport track and the output transport track are connected to a same storage rack, and the input transport track is disposed at an end of a line segment formed by a traveling track of the shuttle trolley and the output transport track is disposed at the other end of the line segment formed by the traveling track of the shuttle trolley.

2. The system according to claim 1, wherein the system further comprises:
a server, configured to determine a storage location corresponding to a piece of goods, and control the input transport track and the shuttle trolley to transport the piece of goods to a corresponding storage location of the piece of goods, wherein the storage location comprises a shelf layer and a goods storage area.

3. The system according to claim 2, wherein the piece of goods is attached with a label for identifying an identity of the piece of goods and a storage location of the piece of goods;
a second label scanner is provided at a connection point between an input transport sub-track and the input transport main track; and
the second label scanner is configured to scan the label of the piece of goods moving on the input transport main track, and send the scanned label to the server, so that the server determines whether to transport the piece of goods to said input transport sub-track according to the scanned label.

4. The system according to claim 3, wherein a shunting apparatus is provided at the connection point between any one input transport sub-track and the input transport main track; and
the shunting apparatus is configured to shunt the piece of goods moving on the input transport main track to the input transport sub-track corresponding to the piece of goods.

5. The system according to claim 2, wherein a third label scanner is provided in a goods buffer are a of a shelf layer; the third label scanner is configured to scan a label of a piece of goods transported from the input transport sub-track to the goods buffer area of the shelf layer, and send an identity of the piece of goods and a storage location indicated by the scanned label to the server, so that the server dispatches a shuttle trolley corresponding to the shelf layer to transport the piece of goods from the goods buffer area of the shelf layer to the goods storage area corresponding to the piece of goods according to the scanned label.

6. The system according to claim 1, wherein a piece of the goods is attached with a label, the label is used to identify an identity of the piece of goods and a shelf layer and a goods storage area specified in advance and corresponding to the piece of goods;
a first label scanner is provided at a connection point between an input transport sub-track and the input transport main track; and
the first label scanner is configured to scan and recognize the label of the piece of goods moving on the input transport main track, and determine an input transport sub-track corresponding to the piece of goods according to a result of the recognition on the label.

7. The system according to claim 6, wherein a shunting apparatus is provided at the connection point between any one input transport sub-track and the input transport main track; and
the shunting apparatus is configured to shunt the piece of goods moving on the input transport main track to the input transport sub-track corresponding to the piece of goods.

8. The system according to claim 1, wherein the input transport main track and the output transport main track comprise a plurality of end-to-end transport segments;
a transport segment comprise a first transport sub-segment and a second transport sub-segment connected to each other, the first transport sub-segment is parallel to a horizontal plane, and the second transport sub-segment is at a predetermined angle with the horizontal plane;
a first transport sub-segment of any one of the transport segments is connected to at least one input transport sub-track, or is connected to at least one output transport sub-track; and
a first transport sub-segment of one of any two adjacent transport segments is connected to a second transport sub-segment of another transport segment of the two adjacent transport segments.

9. The system according to claim 8, wherein the shuttle trolley travels in a track provided between storage rack layers of a same height of two adjacent storage racks; and
the input transport track and the output transport track are respectively connected to one of the two adjacent storage racks in one-to-one correspondence, and the input transport track and the output transport track are disposed at a same end of a line segment formed by a traveling track of the shuttle trolley.

10. The system according to claim 1, wherein the shuttle trolley is a two-station shuttle trolley, and each station accommodates at least one piece of goods at the same time.

11. A method for transporting goods, the method comprising:
receiving a label of a piece of goods moving on the input transport main track scanned by a second label scanner provided at a connection point between an input transport sub-track and an input transport main track of an input transport track; the input transport track comprising the input transport main track and a plurality of input transport sub-tracks, each input transport sub-track corresponding to one shelf layer of a multi-layer storage rack, one end of any one of the input transport sub-tracks being connected to a goods buffer area of a shelf layer of the storage rack, and another end being connected to the input transport main track;
determining, based on the label, whether a storage shelf layer corresponding to the piece of goods corresponds to the input transport sub-track;
in response to determining that the storage shelf layer of the piece of goods corresponds to the input transport sub-track, sending an instruction to a shunting apparatus provided at the connection point between the input transport sub-track and the input transport main track, to cause the shunting apparatus to shunt the piece of goods to the input transport sub-track; and
in response to receiving a label of the piece of goods moving on the input transport sub-track, the label being scanned by a third label scanner provided in the goods buffer area of the shelf layer corresponding to the input transport sub-track, sending an instruction to a shuttle trolley corresponding to the input transport sub-track, to transport the piece of goods from the goods buffer area to a goods storage area corresponding to the piece of goods,
wherein the method further comprises:
receiving a delivery instruction of the piece of goods, wherein the delivery instruction comprises a storage location of the piece of goods, and the storage location comprises a shelf layer and a goods storage area in which the piece of goods is stored; and sending an instruction to a shuttle trolley corresponding to the shelf layer, to instruct the shuttle trolley to transport the piece of goods from the goods storage area to an output transport sub-track connected to the shelf layer of an output transport track, wherein the output transport track comprises an output transport main track and a plurality of output transport sub-tracks; and each output transport sub-track corresponds to one of the shelf layers of the storage rack, one end of any one of the output transport sub-tracks is connected to one of the shelf layers of the storage rack, and the other end is connected to the output transport main track, wherein the input transport track and the output transport track are connected to a same storage rack, and the input transport track is disposed at an end of a line segment formed by a traveling track of the shuttle trolley and the output transport track is disposed at the other end of the line segment formed by the traveling track of the shuttle trolley.

12. An apparatus for transporting goods, the apparatus comprising:
   at least one processor; and
   a memory storing instructions, the instructions when executed by the at least one processor, cause the at least one processor to perform operations, the operations comprising:
   receiving a label of a piece of goods moving on the input transport main track scanned by a second label scanner provided at a connection point between an input transport sub-track and an input transport main track of an input transport track; the input transport track comprising the input transport main track and a plurality of input transport sub-tracks, each input transport sub-track corresponding to one shelf layer of a multi-layer storage rack, one end of any one of the input transport sub-tracks being connected to a goods buffer area of a shelf layer of the storage rack, and the other end being connected to the input transport main track;
   determining, based on the label, whether a storage shelf layer corresponding to the piece of goods corresponds to the input transport sub-track;
   sending, in response to determining that the storage shelf layer of the piece of goods corresponds to the input transport sub-track, an instruction to a shunting apparatus provided at the connection point between the input transport sub-track and the input transport main track, to cause the shunting apparatus to shunt the piece of goods to the input transport sub-track; and
   sending, in response to receiving a label of the piece of goods moving on the input transport sub-track, the label being scanned by a third label scanner provided in the goods buffer area of the shelf layer corresponding to the input transport sub-track, an instruction to a shuttle trolley corresponding to the input transport sub-track, to transport the piece of goods from the goods buffer area to a goods storage area corresponding to the piece of goods,
   wherein the operations further comprise:
   receiving a delivery instruction of the piece of goods, wherein the delivery instruction comprises a storage location of the piece of goods, and the storage location comprises a shelf layer and a goods storage area in which the piece of goods is stored; and
   sending an instruction to a shuttle trolley corresponding to the shelf layer, to instruct the shuttle trolley to transport the piece of goods from the goods storage area to an output transport sub-track connected to the shelf layer of an output transport track, wherein the output transport track comprises an output transport main track and a plurality of output transport sub-tracks; and each output transport sub-track corresponds to one of the shelf layers of the storage rack, one end of any one of the output transport sub-tracks is connected to one of the shelf layers of the storage rack, and the other end is connected to the output transport main track, wherein the input transport track and the output transport track are connected to a same storage rack, and the input transport track is disposed at an end of a line segment formed by a traveling track of the shuttle trolley and the output transport track is disposed at the other end of the line segment formed by the traveling track of the shuttle trolley.

13. A non-transitory computer readable storage medium, storing a computer program thereon, the program, when executed by a processor, cause the processor to perform operations, the operations comprising:
   receiving a label of a piece of goods moving on the input transport main track scanned by a second label scanner provided at a connection point between an input transport sub-track and an input transport main track of an input transport track; the input transport track comprising the input transport main track and a plurality of input transport sub-tracks, each input transport sub-track corresponding to one shelf layer of a multi-layer storage rack, one end of any one of the input transport sub-tracks being connected to a goods buffer area of a shelf layer of the storage rack, and the other end being connected to the input transport main track;
   determining, based on the label, whether a storage shelf layer corresponding to the piece of goods corresponds to the input transport sub-track;
   in response to determining that the storage shelf layer of the piece of goods corresponds to the input transport sub-track, sending an instruction to a shunting apparatus provided at the connection point between the input transport sub-track and the input transport main track, to cause the shunting apparatus to shunt the piece of goods to the input transport sub-track; and
   in response to receiving a label of the piece of goods moving on the input transport sub-track, the label being scanned by a third label scanner provided in the goods buffer area of the shelf layer corresponding to the input transport sub-track, sending an instruction to a shuttle trolley corresponding to the input transport sub-track, to transport the piece of goods from the goods buffer area to a goods storage area corresponding to the piece of goods,
   wherein the operations further comprise:
   receiving a delivery instruction of the piece of goods, wherein the delivery instruction comprises a storage location of the piece of goods, and the storage location comprises a shelf layer and a goods storage area in which the piece of goods is stored; and
   sending an instruction to a shuttle trolley corresponding to the shelf layer, to instruct the shuttle trolley to transport the piece of goods from the goods storage area to an output transport sub-track connected to the shelf layer of an output transport track, wherein the output transport track comprises an output transport main track and a plurality of output transport sub-tracks; and each output transport sub-track corresponds to one of the shelf layers of the storage rack, one end of any one of the output transport sub-tracks is connected to one of the shelf layers of the storage rack, and the other end is connected to the output transport main track, wherein the input transport track and the output transport track are connected to a same storage rack, and the input transport track is disposed at an end of a line segment formed by a traveling track of the shuttle trolley and the output transport track is disposed at the other end of the line segment formed by the traveling track of the shuttle trolley.

* * * * *